United States Patent Office 3,639,315
Patented Feb. 1, 1972

3,639,315
PROCESS FOR MODIFYING HYDROXYL-CONTAINING ALKYDS AND POLYESTERS IN WATER DISPERSION
Jaime Rodriguez, Minneapolis, Minn., assignor to Ashland Oil, Inc., Ashland, Ky.
No Drawing. Filed Feb. 13, 1968, Ser. No. 705,019
Int. Cl. C08g 22/06; C09d 3/72
U.S. Cl. 260—22 TN                     3 Claims

ABSTRACT OF THE DISCLOSURE

Process and products formed by reacting hydroxyl-containing, water-dispersible resins such as alkyds and polyesters with organic isocyanate in water dispersions by the addition with agitation of 0.1 to 20.0% of an organic isocyanate to the dispersed resin over a period of about 5 to 180 minutes at a temperature of 60° to 200° F. The products are water-dispersible coating resins capable of air drying in a short time.

BACKGROUND OF THE INVENTION

Water-based paints and coatings are becoming increasingly popular as compared to organic solvent-based paints because of the numerous advantages the water-based paints have to offer. These advantages include the reduction of fire hazard, reduction in odors, lower costs because of the use of water to thin the paint or coating material as well as to clean the utensils used in the painting operation. The introduction of urethane linkages into polymer chains is desirable in order to derive the advantages of flexibility, toughness, durability, solvent resistance, and water resistance.

Prior attempts to modify water-soluble or water-dispersible resins by reaction with organic isocyanates have generally been made in organic solvent solution rather than water because of the prevalent feeling among those skilled in the art that the isocyanate would preferentially react with the water rather than the dispersed resin. When the reaction is conducted in a solvent which is inert to isocyanate, the resulting resin forms extremely viscous water dispersions. Consequently, it has not been possible to obtain the anticipated advantages of polyurethane-modified water-dispersible resins, since dispersions with useful resin solids at viscosities which would allow application by conventional means were not attainable.

SUMMARY OF THE INVENTION

It has now been found that water-dispersible, hydroxyl-containing resins may be reacted directly with organic isocyanates by addition of a mono- or polyisocyanate to a water dispersion of the resin. That this reaction is possible is surprising, since the reactivity of isocyanates with water is well known and it would be expected that an inert solvent would be necessary. It was also found that the urethane-modified resin dispersions formed by the direct addition of isocyanate to water dispersion of resins were stable and had low viscosities compared to resins which had been reacted with isocyanate in solvent, solution, or dispersion. Another unexpected property of the resins modified by the process of this invention is a remarkably improved dry time.

It is, therefore, an object of this invention to produce urethane-modified, water-dispersible resins from hydroxyl-containing resins.

It is another object of this invention to produce these modified resins by direct addition of isocyanate to a water dispersion of the resin.

Still another object of this invention is to produce low viscosity water dispersions of urethane-modified, hydroxyl-containing resins.

Still another object of this invention is to produce urethane-modified resins, particularly from drying alkyds, which have improved dry time.

Still other objects will be apparent from the following description of the invention.

The foregoing objects are accomplished in accordance with this invention by providing a water solution or dispersion of a hydroxyl-containing polymer and adding an organic isocyanate directly to the water solution or dispersion. The reaction is simply conducted by agitating a solution or dispersion of the resin in a concentration which gives a convenient viscosity, and adding the organic isocyanate over a period of time of about 5 to 180 minutes, at a temperature from about 65° to 200° F. The reaction mixture is then maintained at a temperature of 85° to 150° F. under agitation until substantially all of organic isocyanate has reacted. Preferably, the reaction is conducted at a temperature of 85° F. for a period of time of about 60 to 180 minutes. The isocyanate is added in an amount of about 0.1 to 20.0%, and preferably 0.5 to 10.0%, by weight of the dispersed resin solids.

The term "water solution or dispersion" includes aqueous solutions containing additives such as ammonia, organic amines, surfactants, and the like, for the purpose of improving solubility or dispersibility of the resin.

The resins capable of modification by the process of this invention are characterized by the fact that they contain free hydroxyl groups and are water-soluble or water-dispersible. In general, materials which may be modified include water-soluble or water-dispersible polyesters, drying alkyds and non-drying alkyds.

Particularly valuable urethane-modified drying alkyds are obtained by reacting an isocyanate with the drying alkyd resins as prepared in copending U.S. application Ser. No. 481,119, now U.S. Patent No. 3,442,835. The water-dispersible materials described therein consist essentially of the ingredients and their proportions as follows:

| | Percent |
|---|---|
| Drying oil | 20–45 |
| Polyhydric alcohol containing 3–6 hydroxyl groups/molecule | 15–40 |
| Polyoxyethylene glycols having a molecular weight from 600 to 6000 | 5–15 |
| Non-oxidizing, non-oil, monobasic carboxylic acid, having 6–18 carbon atoms/molecule | 10–20 |
| Dicarboxylic acid or anhydride, having 4–10 carbon atoms/molecule | 20–35 |

The foregoing resin is prepared by heating the drying oil, the glycol, the carboxylic acid, and approximately one-third of the alcohol at 350° to 550° F. until the mixture has an acid value of 10 to 20, and thereafter adding the remaining ingredients and heating the mixture at 350° to 550° F. until the acid value is 5 to 15. This product is then neutralized with an amine and dispersed in water to produce any desired viscosity.

Suitable non-drying alkyds useful as the starting materials in this invention may be prepared by substitution of the drying oil in the above formula with a non-drying oil. Urethane-modified, non-drying alkyds are particularly useful as components in coatings or paints containing other crosslinkable resins such as the aminoplasts.

Polyesters are herein distinguished from alkyds in that the polyesters are free from fatty acids. Suitable water-dispersible polyesters are disclosed in copending U.S. application Ser. No. 527,481, filed Feb. 15, 1965, now abandoned. These polyesters comprise the following ingredients in parts by weight:

|  | Percent |
|---|---|
| (A) A non-oxidizing acid material selected from the group consisting of: <br> (1) aromatic dicarboxylic acids, <br> (2) saturated aliphatic dicarboxylic acids of 4–10 carbon atoms/molecule, and <br> (3) anhydrides of the foregoing acids | 15–40 |
| (B) A polyalkylene glycol having a molecular weight of 600 to 6000 and having repeating oxyalkylene groups in the polymer chain of 2–3 carbon atoms per group | 5–15 |
| (C) A polyhydric alcohol having 2–6 hydroxyl groups/molecule | 15–40 |
| (D) A polymerizable, unsaturated acid material selected from the group consisting of: <br> (1) ethylenically unsaturated aliphatic dicarboxylic acids of 4–10 carbon atoms/molecule, and <br> (2) ethylenically unsaturated aliphatic dicarboxylic acid anhydrides of 4–10 carbon atoms/molecule | 1–5 |
| (E) A polymerizable, ethylenically unsaturated monomer | 5–50 |
| (F) A non-oxidizing monocarboxylic acid having 7–18 carbon atoms/molecule | 0–30 |

These polyesters are prepared by heating the ingredients in the presence of 2–10% (based on the weight of ingredient E) of a peroxide polymerization catalyst at a temperature of 200° to 500° F. until the mixture exhibits an acid value of less than 15 and until polymerization is essentially completed, neutralizing the polymerized mixture and recovering a water-dispersible, vinyl-modified, non-oxidizing polyester.

Still other water-soluble and water-dispersible polyesters suitable for the process of this invention are disclosed in U.S. Pat. 3,223,659 to Curtice et al. The polyesters disclosed therein are comprised of the following ingredients in parts by weight:

|  | Percent |
|---|---|
| (A) Mono-saturated carboxylic acids | 15–30 |
| (B) Saturated dicarboxylic acids | 22–40 |
| (C) Polyethylene glycol or polypropylene glycol | 4–19 |
| (D) Polyhydric alcohol other than polyethylene or polypropylene glycol | 22–40 |

The isocyanates useful in this invention are aromatic, aliphatic or cycloaliphatic mono- or polyisocyanates. Diisocyanates are preferred. Representative examples of useful polyisocyanates include the following, among others:

toluene-2,4-diisocyanate;
toluene-2,6-diisocyanate;
3-phenyl-2-ethylene-diisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenyl ether;
5,6-dimethyl-1,3-phenylenediisocyanate;
2,4-dimethyl-1,3-phenylenediisocyanate;
4,4'-diisocyanatodiphenyl ether;
4,6-dimethyl-1,3-phenylenediisocyanate;
9,10-anthracenediisocyanate;
2,4,6-toluenetriisocyanate;
2,4,4'-triisocyanatodiphenyl ether;
1,4-tetramethylenediisocyanate;
1,6-hexmethylenediisocyanate;
1,10-decamethylenediisocyanate;
1,3-cyclohexylenediisocyanate;
4,4'-methylene-bis(cyclohexylisocyanate); and
xylenediisocyanate.

Monoisocyanates are also operative and useful in the present invention. As the diisocyanates, the monoisocyanates may be aliphatic, cycloaliphatic or aromatic. Among the monoisocyanates which may be mentioned are the lower alkyl members such as methylisocyanate, ethylisocyanate, and t-butylisocyanate; aromatic isocyanates such as phenylisocyanate, benzylisocyanate, tolueneisocyanate and xyleneisocyanate; and cycloaliphatic members such as cyclohexylisocyanate.

Examples of other representative polyisocyanates which can be used are described in U.S. Pats. 2,683,730; 2,292,442; and 2,929,794. Mixtures of any of the foregoing organic polyisocyanates can also be employed. For example, a mixture of toluene-2,4-diisocyanate and toluene-2,6-diisocyanate in the relative ratio of 80/20 is particularly suitable in this invention.

Urethane modified resins produced by the process of this invention may be used for a variety of coating and/or paint purposes. They may be further modified physically and/or chemically by the addition of agents such as pigments, extenders, plasticizers, ultraviolet light stabilizers, solvents, drying oils, coloring agents, and the like. They are suitable for blending with a variety of other water-soluble or water-dispersible resins such as aminoplasts, epoxies, polyesters, alkyds, etc.

As previously stated, compositions of the present invention may be employed as coating and paint compositions. They may be applied by conventional means such as dipping, brushing, or spraying onto a variety of surfaces such as wood, paper, textiles, synthetic resins, ceramics, ferrous metals, non-ferrous metals, and the like.

The invention may be more fully understood by reference to the following examples. All parts and percentages are by weight unless otherwise indicated. These examples are illustrative of certain embodiments designed to teach those skilled in the art how to practice the invention, and to represent the best mode contemplated for carrying out the invention, and are not intended to limit the scope of the invention in any way.

EXAMPLE 1

This example illustrates the preparation of a water-dispersible drying alkyd which may be modified by the process of this invention.

The following ingredients were used:

|  | Parts by wt. |
|---|---|
| Safflower oil | 261.1 |
| Pentaerythritol | 154.0 |
| p-Tertiary-butyl benzoic acid | 186.1 |
| Polyoxyethylene glycol (M.W.=2700—3200) | 88.8 |
| Lithium hydroxide | 0.07 |
| Phthalic anhydride | 205.5 |
| Isophthalic acid | 73.6 |
| Pentaerythritol | 90.4 |

The first five ingredients above were charged into a flask fitted with a thermometer, a mechanical agitator, and a water trap to which was attached a reflux condenser. The temperature was raised to 460° F. and maintained at that level until an acid value of less than 5 was obtained. The resin was cooled and the last three ingredients were added. The reaction was then heated to 430° F. until an acid value of 14.4 was obtained. Triethylamine (2.2 parts) was then added to the resin which was then dispersed in water, yielding a white, opalescent emulsion having a viscosity of 4000 c.p.s., a pH of 7.15, and non-volatiles of 42.5%.

EXAMPLE 2

This example illustrates the modification of hydroxyl-containing water-dispersible drying alkyds by reaction with an aromatic diisocyanate.

To 460 g. of the drying alkyd dispersion obtained in Example 1, 13.3 g. (7% based on alkyd solids) of toluenediisocyanate was added with agitation at 80° F. over a period of 60 minutes. The reaction mixture was maintained at 80° F. under agitation for a further period of 120 minutes. The product had a viscosity of 600 c.p.s.

EXAMPLE 3

This example compares the unmodified, hydroxyl-containing polyester of Example 1 and the urethane-modified polyester of Example 2.

White titranium dioxide-pigmented films at a 1/1 pigment/binder ratio with the resin dispersions obtained in Examples 1 and 2 were cast as 3 mil wet films in the presence of 0.1% of an emulsifiable drier and allowed to dry. Both films were clear with no surface imperfections, glossy, and flexible. The Sward hardness was:

| Example 1 (unmodified) | Example 2 (modified) |
|---|---|
| 2 hours — 0 | 2 hours — 18 |
| 4 hours — 10 | 4 hours — 20 |
| 7 hours — 14 | 7 hours — 22 |
| 24 hours — 18 | 24 hours — 26 |
| 7 days — 26 | 7 days — 34 |

It was observed that when the water is flashed off, the composition of Example 1 (unmodified polyester) dries to a tough film in about four hours, while the film of Example 2 (modified polyester) requires about thirty minutes to dry to the same state.

EXAMPLE 4

This example illustrates the modification of a hydroxyl-containing, water-dispersible drying alkyd by reaction with a monoisocyanate.

To 475 g. of the aqueous dispersion drying alkyd of Example 1 further diluted with 55 g. of water, there was added 20 g. (10% based on alkyd solids) of phenylisocyanate. The isocyanate addition was at 80° F. over a period of 25 minutes and the reaction mix was maintained at 80° F. under agitation for an additional 180 minutes. The product had a viscosity of 130 cps. at 40% non-volatile content. A film prepared with this modified resin had a faster dry time than the unmodified resin of Example 1.

EXAMPLE 5

This example illustrates the modification of a hydroxyl-containing, water-dispersible drying alkyd by reaction with an aliphatic diisocyanate.

To 475 g. of the drying alkyd dispersion of Example 1 further diluted with 46 g. of water, 14 g. (7% based on alkyd solids) of 4,4'-methylene-bis(cyclohexyl-isocyanate) was added with agitation at 80° F. for a period of 35 minutes. Dibutyl tin dilaurate (0.15 g.) was added and the reaction mixture was maintained at 75° to 80° F. under agitation for an additional period of 180 minutes. The product had a viscosity of 130 cps. at 40% non-volatiles. Films prepared from the modified resin had a faster dry time than those prepared from the unmodified resin of Example 1.

EXAMPLE 6

This example illustrates the preparation of a high isocyanate modified alkyd resin.

The following ingredients were used:

| | Parts by wt. |
|---|---|
| Safflower oil | 732.1 |
| Pentaerythritol | 133.6 |
| Calcium naphthanate (4% Co) | 1.8 |
| Polyoxyethylene glycol (M.W.=2700–3200) | 120.0 |
| Phthalic anhydride | 151.8 |
| Toluenediisocyanate | 112.0 |
| Triethylamine | 30.0 |

The first four ingredients were charged to a flask fitted with a thermometer, a mechanical agitator, and a water trap to which was attached a reflux condenser. The temperature was raised to 480° F. and maintained at that level for one hour. The reactants were then cooled and the phthalic anhydride added and reheated to 420° F. until the acid number fell to 18.4. The reactants were then cooled to 150° F. and the toluenediisocyanate added. The temperature was then maintained at 180° F. for one hour. Then the triethylamine was added and the hot resin poured into enough hot water to give 35% non-volatiles.

To the water dispersion of alkyd resin modified with 9% toluenediisocyanate, an additional amount of toluenediisocyanate was added to give a 16% modification. The extra addition was done over a period of 10 minutes, at 75° F. with agitation. The resultant dispersion had a viscosity of 150 cps. and exhibited good dry characteristics.

Although the invention has been described in considerable detail with reference to certain preferred embodiments thereof, it will be understood that variations and modifications can be effected within the spirit and scope of the invention as described above and as defined in the appended claims.

What is claimed is:

1. A process for preparing a urethane-modified, water-dispersed resin, comprising the steps of:
    (1) dispersing a hydroxyl-containing, water-dispersible natural drying oil modified alkyd resin in water;
    (2) adding, with agitation, from 0.1 to 20.0% by weight of an organic isocyanate selected from the group consisting of toluene diisocyanate, phenyl isocyanate and 4,4'-methylene-bis(cyclohexyl isocyanate) over a period of about 5 to 180 minutes at a temperature from 65° to 200° F.; and
    (3) continuing the agitation until substantially all of said organic isocyanate has reacted.

2. The process of claim 1 wherein said hydroxyl-containing, water-dispersed resin a natural drying oil modified alkyd consisting essentially of the substantially complete esterification product of:

| | Percent by wt. |
|---|---|
| Natural drying oil | 20–45 |
| Polyhydric alcohol containing 3–6 hydroxyl groups/molecule | 15–40 |
| Polyoxyethylene glycols having a molecular weight from 600 to 6000 | 5–15 |
| Non-oxidizing, non-oil, monobasic carboxylic acid, having 6–18 carbon atoms/molecule | 10–20 |
| Dicarboxylic acid or anhydride having 4–10 carbon atoms/molecule | 20–35 |

3. The process of claim 2 wherein said organic isocyanate is toluenediisocyanate.

References Cited

UNITED STATES PATENTS

| 2,929,800 | 3/1960 | Hill | 260—77.5 |
| 3,142,652 | 7/1964 | Pace | 260—22 |
| 3,148,173 | 9/1964 | Axelrood | 260—75 |
| 3,213,049 | 10/1965 | Heiss | 260—29.2 |
| 3,437,618 | 4/1969 | Taft | 260—22 |
| 3,437,624 | 4/1969 | Dawn et al. | 260—29.2 |
| 3,442,835 | 5/1969 | Curtice et al. | 260—22 |

FOREIGN PATENTS

| 703,360 | 2/1965 | Canada | 260—29.2 |

DONALD E. CZAJA, Primary Examiner

R. W. GRIFFIN, Assistant Examiner

U.S. Cl. X.R.

117—161 KP; 260— 29.2 TN, 77.5 AA

UNITED STATES PATENT OFFICE
CERTIFICATE OF CORRECTION

Patent No. 3,639,315          Dated February 1, 1972

Inventor(s) Jaime Rodriguez

It is certified that error appears in the above-identified patent and that said Letters Patent are hereby corrected as shown below:

Column 3, line 71, the word "hexmethylenediisocyanate" should be --hexamethylenediisocyanate--

Column 6, line 36, after the word "resin" should be inserted --is--

Signed and sealed this 1st day of August 1972.

(SEAL)
Attest:

EDWARD M. FLETCHER, JR.      ROBERT GOTTSCHALK
Attesting Officer             Commissioner of Patents